United States Patent
Geirhofer et al.

(10) Patent No.: US 9,337,982 B2
(45) Date of Patent: May 10, 2016

(54) ADAPTIVE ANTENNA MANAGEMENT IN LTE

(71) Applicant: QUALCOMM Incorporated, San Diego, CA (US)

(72) Inventors: Stefan Geirhofer, Brooklyn, NY (US); Wanshi Chen, San Diego, CA (US); Peter Gaal, San Diego, CA (US); Hao Xu, San Diego, CA (US); Xiaoxia Zhang, San Diego, CA (US); Ashok Mantravadi, San Diego, CA (US); Tao Luo, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 82 days.

(21) Appl. No.: 14/243,753

(22) Filed: Apr. 2, 2014

(65) Prior Publication Data

US 2014/0301297 A1    Oct. 9, 2014

Related U.S. Application Data

(60) Provisional application No. 61/808,913, filed on Apr. 5, 2013, provisional application No. 61/809,243, filed on Apr. 5, 2013.

(51) Int. Cl.
| | |
|---|---|
| *H04W 4/00* | (2009.01) |
| *H04L 5/00* | (2006.01) |
| *H04B 7/06* | (2006.01) |
| *H04B 7/04* | (2006.01) |

(52) U.S. Cl.
CPC ............ H04L 5/0053 (2013.01); H04B 7/0413 (2013.01); H04B 7/0626 (2013.01); H04B 7/0689 (2013.01); H04B 7/0691 (2013.01); *H04B 7/0617* (2013.01)

(58) Field of Classification Search
None
See application file for complete search history.

(56) References Cited

U.S. PATENT DOCUMENTS

| | | | | |
|---|---|---|---|---|
| 9,054,844 B2* | 6/2015 | Jang | ...................... | H04L 5/0053 |
| 2011/0085504 A1* | 4/2011 | Chong | .................. | H04L 1/0606 370/329 |
| 2011/0319025 A1* | 12/2011 | Siomina | ................. | H04B 7/024 455/63.1 |
| 2012/0014418 A1* | 1/2012 | Salim | ................... | H04B 7/0626 375/219 |
| 2012/0039270 A1* | 2/2012 | Nguyen | ................ | H04J 11/003 370/329 |
| 2012/0127878 A1* | 5/2012 | Kim | ..................... | H04W 74/002 370/252 |
| 2013/0294352 A1* | 11/2013 | Park | ....................... | H04B 7/024 370/328 |
| 2014/0092823 A1* | 4/2014 | Song | ......................... | H04L 1/00 370/329 |
| 2014/0092877 A1* | 4/2014 | Kazmi | .................. | H04W 88/06 370/336 |
| 2014/0153456 A1* | 6/2014 | Park | ...................... | H04W 52/38 370/311 |
| 2014/0169430 A1* | 6/2014 | Nilsson | ................. | H04B 7/043 375/227 |

FOREIGN PATENT DOCUMENTS

| | | |
|---|---|---|
| EP | 2566267 A1 | 3/2013 |
| WO | WO-2011160670 A1 | 12/2011 |
| WO | WO-2012148478 A1 | 11/2012 |

OTHER PUBLICATIONS

International Search Report and Written Opinion—PCT/US2014/032801—ISA/EPO—Jun. 17, 2014.

\* cited by examiner

*Primary Examiner* — Michael J Moore, Jr.
(74) *Attorney, Agent, or Firm* — Patterson & Sheridan, LLP

(57) ABSTRACT

Certain aspects of the present disclosure relate to methods and apparatus for adaptive antenna management in LTE. Devices and networks capable of transmitting and receiving signals using a variable number of transmitting or receiving antennas using LTE radio access technology are described.

28 Claims, 9 Drawing Sheets

ADAPTIVE ANTENNA MANAGEMENT IN LTE

CROSS-REFERENCE TO RELATED APPLICATIONS

The present application for patent claims priority to U.S. Provisional Applications No. 61/808,913, filed Apr. 5, 2013, and No. 61/809,243, filed Apr. 5, 2013, which are assigned to the assignee of the present application and hereby expressly incorporated by reference herein in their entirety.

FIELD

The present disclosure relates generally to communication systems, and more particularly, to methods and apparatus for sharing a device's physical antennas between multiple wireless protocols.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency divisional multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE/LTE-Advanced is a set of enhancements to the Universal Mobile Telecommunications System (UMTS) mobile standard promulgated by Third Generation Partnership Project (3GPP). It is designed to better support mobile broadband Internet access by improving spectral efficiency, lower costs, improve services, make use of new spectrum, and better integrate with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

SUMMARY

Certain aspects of the present disclosure provide a method for wireless communications by a base station (BS). The method generally includes determining scheduling information for one or more downlink channels transmitted in one or more cells that interfere or potentially interfere with at least a first user equipment (UE) served in a serving cell, and signaling the scheduling information to the UE. The one or more cells may be a neighbor of the serving cell.

Certain aspects of the present disclosure provide a method for wireless communications by a user equipment (UE). The method generally includes receiving signaling of scheduling information for one or more downlink channels transmitted in one or more cells that interfere or potentially interfere with at least a first user equipment (UE) served in a serving cell, and using the information to mitigate interference by transmissions from at least one of the serving cell or one or more cells. The one or more cells may include a neighbor of the serving cell.

DETAILED DESCRIPTION

Figure 1:
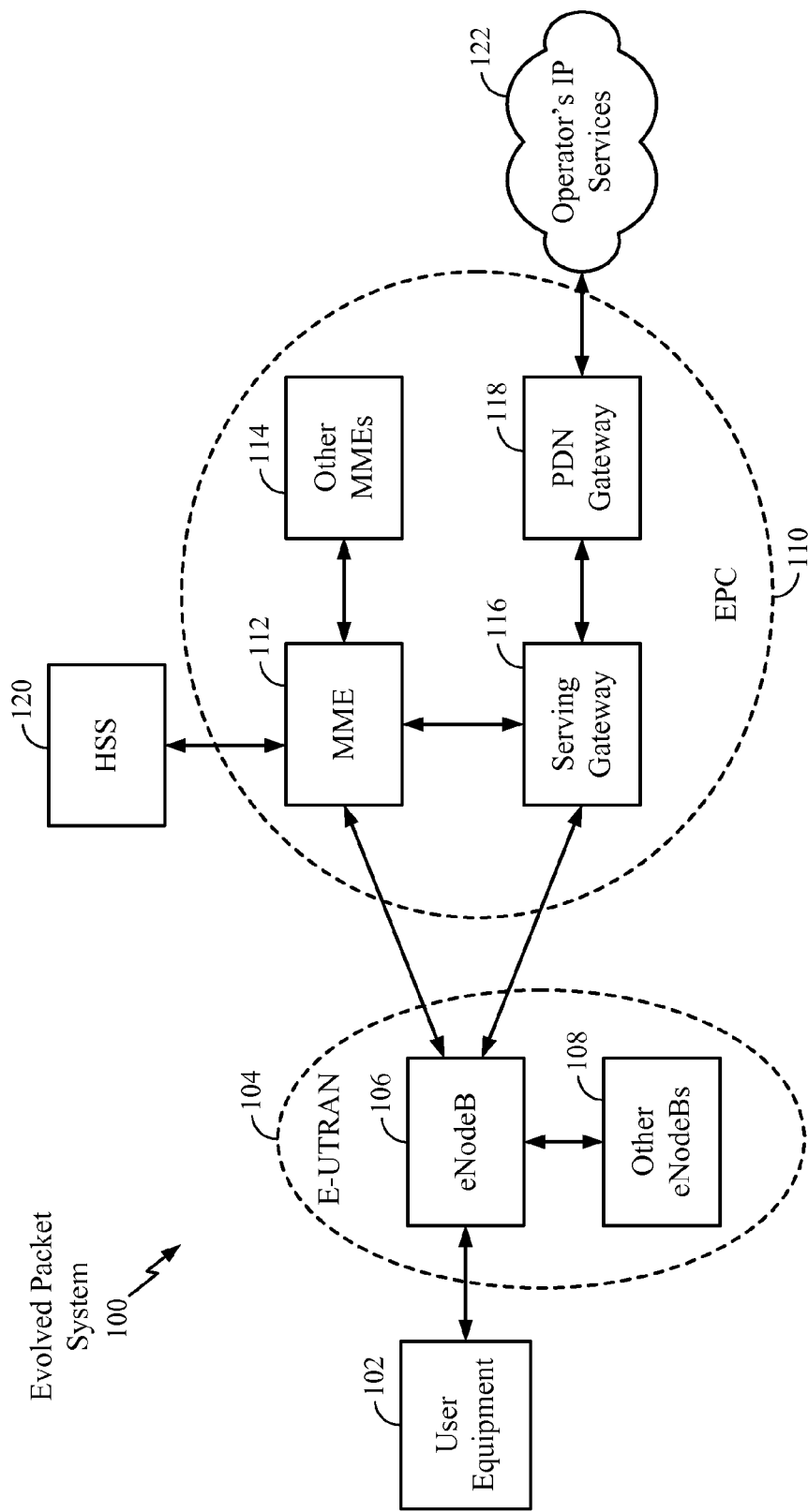
FIG. 1 is a diagram illustrating an example of a network architecture.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using hardware, software/firmware, or combinations thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software/firmware, middleware, microcode, hardware description language, or otherwise.

Accordingly, in one or more exemplary embodiments, the functions described may be implemented in hardware, software/firmware, or combinations thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

FIG. 1 is a diagram illustrating an LTE network architecture 100. The LTE network architecture 100 may be referred to as an Evolved Packet System (EPS) 100. The EPS 100 may include one or more user equipment (UE) 102, an Evolved UMTS Terrestrial Radio Access Network (E-UTRAN) 104, an Evolved Packet Core (EPC) 110, a Home Subscriber Server (HSS) 120, and an Operator's Internet Protocol (IP) Services 122. The EPS can interconnect with other access networks, but for simplicity those entities/interfaces are not shown. Exemplary other access networks may include an IP Multimedia Subsystem (IMS) Packet Data Network (PDN), Internet PDN, Administrative PDN (e.g., Provisioning PDN), carrier-specific PDN, operator-specific PDN, and/or GPS PDN. As shown, the EPS provides packet-switched services, however, as those skilled in the art will readily appreciate, the various concepts presented throughout this disclosure may be extended to networks providing circuit-switched services.

The E-UTRAN includes the evolved Node B (eNB) 106 and other eNBs 108. The eNB 106 provides user and control plane protocol terminations toward the UE 102. The eNB 106 may be connected to the other eNBs 108 via an X2 interface (e.g., backhaul). The eNB 106 may also be referred to as a base station, a base transceiver station, a radio base station, a radio transceiver, a transceiver function, a basic service set (BSS), an extended service set (ESS), or some other suitable terminology. The eNB 106 provides an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a netbook, a smart book, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 106 is connected by an S1 interface to the EPC 110. The EPC 110 includes a Mobility Management Entity (MME) 112, other MMEs 114, a Serving Gateway 116, and a Packet Data Network (PDN) Gateway 118. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 is connected to the Operator's IP Services 122. The Operator's IP Services 122 may include, for example, the Internet, the Intranet, an IP Multimedia Subsystem (IMS), and a PS Streaming Service (PSS). In this manner, the UE 102 may be coupled to the PDN through the LTE network.

Figure 2:
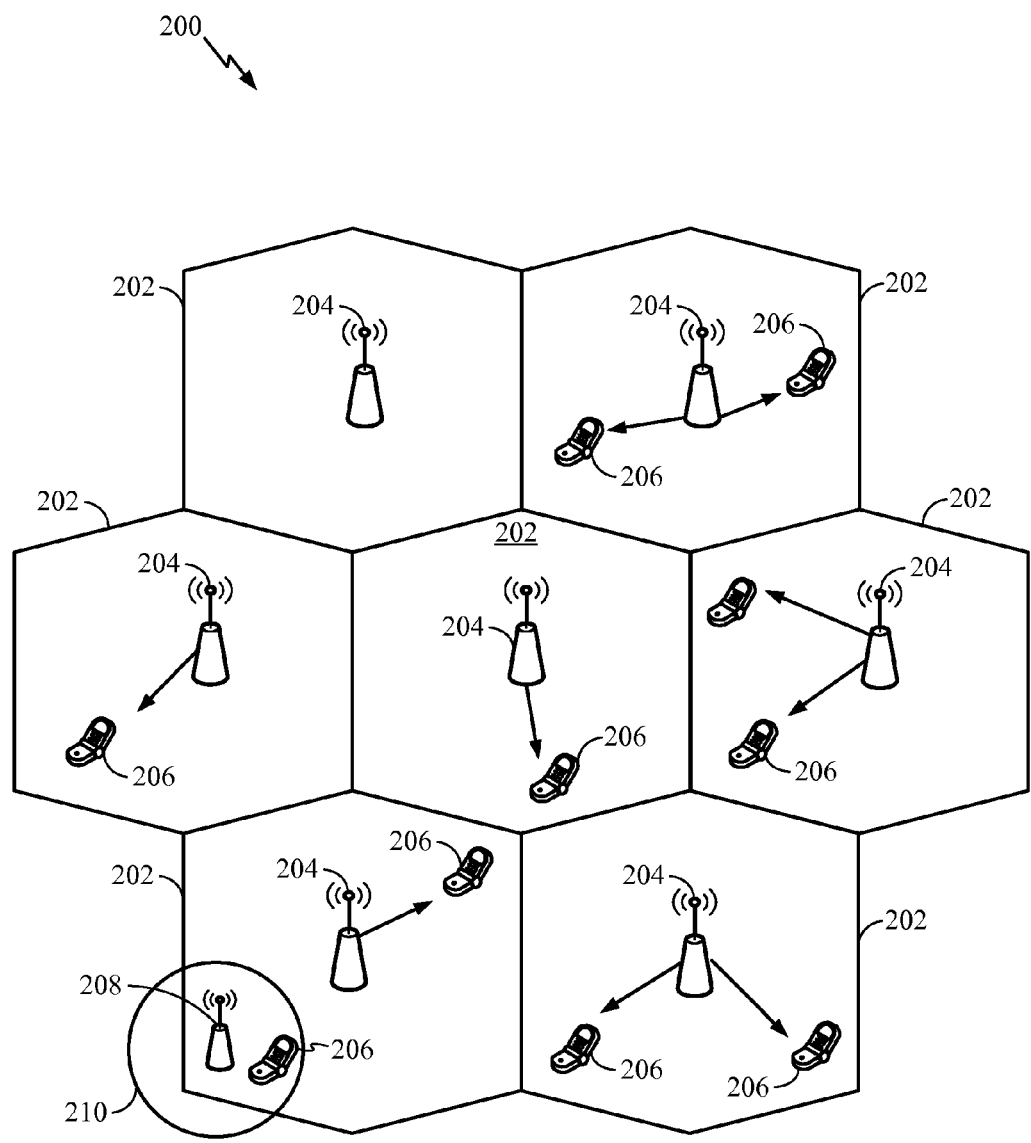
FIG. 2 is a diagram illustrating an example of an access network.

FIG. 2 is a diagram illustrating an example of an access network 200 in an LTE network architecture. In this example, the access network 200 is divided into a number of cellular regions (cells) 202. One or more lower power class eNBs 208 may have cellular regions 210 that overlap with one or more of the cells 202. A lower power class eNB 208 may be referred to as a remote radio head (RRH). The lower power class eNB 208 may be a femto cell (e.g., home eNB (HeNB)), pico cell, or micro cell. The macro eNBs 204 are each assigned to a respective cell 202 and are configured to provide an access point to the EPC 110 for all the UEs 206 in the cells 202. There is no centralized controller in this example of an access network 200, but a centralized controller may be used in alternative configurations. The eNBs 204 are responsible for all radio related functions including radio bearer control, admission control, mobility control, scheduling, security, and connectivity to the serving gateway 116.

The modulation and multiple access scheme employed by the access network 200 may vary depending on the particular telecommunications standard being deployed. In LTE applications, OFDM is used on the DL and SC-FDMA is used on the UL to support both frequency division duplexing (FDD) and time division duplexing (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), Ultra Mobile Broadband (UMB), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 204 may have multiple antennas supporting MIMO technology. The use of MIMO technology enables the eNBs 204 to exploit the spatial domain to support spatial multiplexing, beamforming, and transmit diversity. Spatial multiplexing may be used to transmit different streams of data simultaneously on the same frequency. The data streams may be transmitted to a single UE 206 to increase the data rate or to multiple UEs 206 to increase the overall system capacity. This is achieved by spatially precoding each data stream (e.g., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the eNB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

Figure 3:
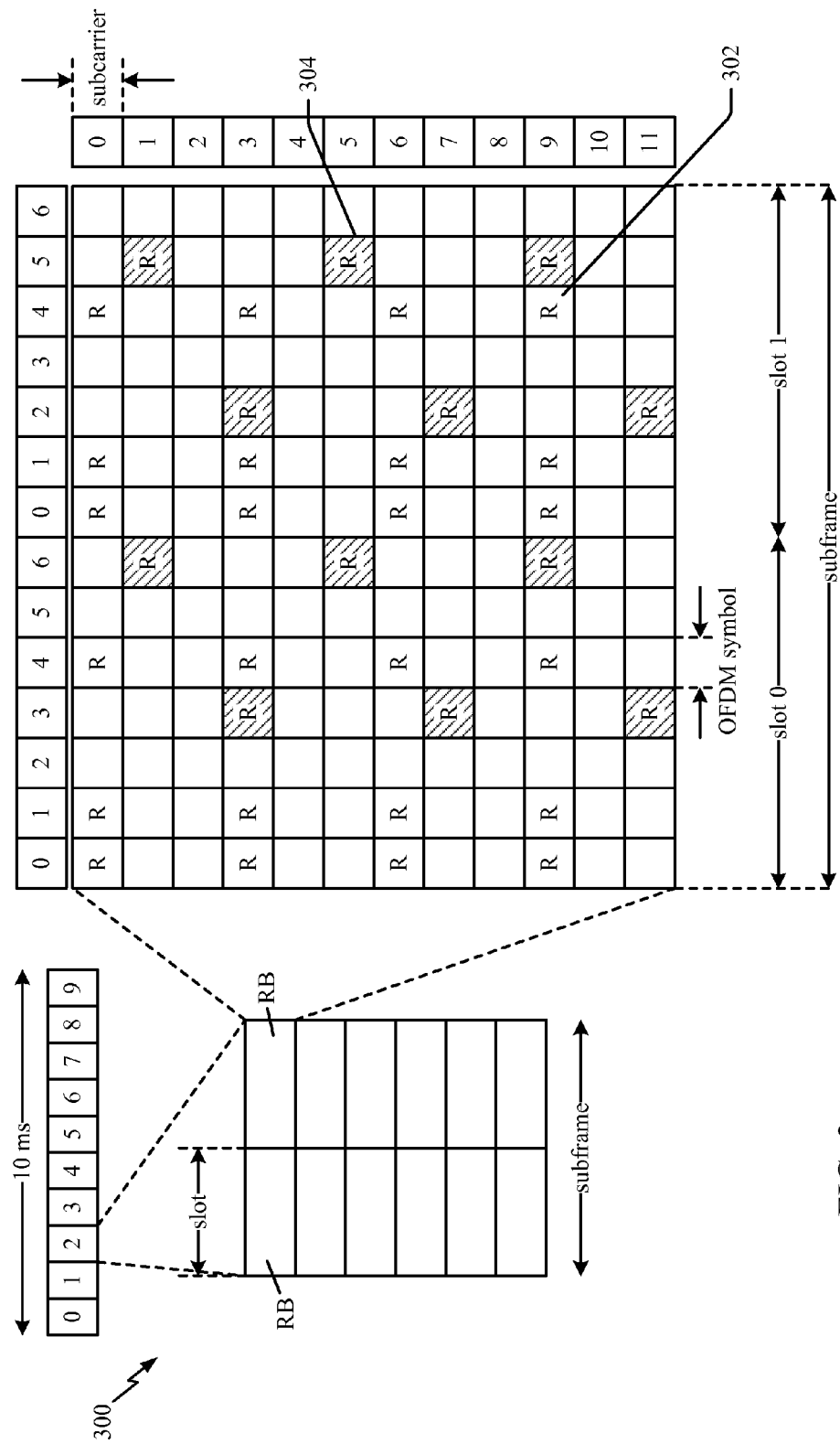
FIG. 3 is a diagram illustrating an example of a DL frame structure in LTE.

FIG. 3 is a diagram 300 illustrating an example of a DL frame structure in LTE. A frame (10 ms) may be divided into 10 equally sized sub-frames with indices of 0 through 9. Each sub-frame may include two consecutive time slots. A resource grid may be used to represent two time slots, each time slot including a resource block. The resource grid is divided into multiple resource elements. In LTE, a resource block contains 12 consecutive subcarriers in the frequency domain and, for a normal cyclic prefix in each OFDM symbol, 7 consecutive OFDM symbols in the time domain, or 84 resource elements. For an extended cyclic prefix, a resource block contains 6 consecutive OFDM symbols in the time domain and has 72 resource elements. Some of the resource elements, as indicated as R 302, 304, include DL reference signals (DL-RS). The DL-RS include Cell-specific RS (CRS) (also sometimes called common RS) 302 and UE-specific RS (UE-RS) 304. UE-RS 304 are transmitted only on the resource blocks upon which the corresponding physical DL shared channel (PD-SCH) is mapped. The number of bits carried by each resource element depends on the modulation scheme. Thus, the more resource blocks that a UE receives and the higher the modulation scheme, the higher the data rate for the UE.

In LTE, an eNB may send a primary synchronization signal (PSS) and a secondary synchronization signal (SSS) for each cell in the eNB. The primary and secondary synchronization signals may be sent in symbol periods 6 and 5, respectively, in each of subframes 0 and 5 of each radio frame with the normal cyclic prefix (CP). The synchronization signals may be used by UEs for cell detection and acquisition. The eNB may send a Physical Broadcast Channel (PBCH) in symbol periods 0 to 3 in slot 1 of subframe 0. The PBCH may carry certain system information.

The eNB may send a Physical Control Format Indicator Channel (PCFICH) in the first symbol period of each subframe. The PCFICH may convey the number of symbol periods (M) used for control channels, where M may be equal to 1, 2 or 3 and may change from subframe to subframe. M may also be equal to 4 for a small system bandwidth, e.g., with less than 10 resource blocks. The eNB may send a Physical HARQ Indicator Channel (PHICH) and a Physical Downlink Control Channel (PDCCH) in the first M symbol periods of each subframe. The PHICH may carry information to support hybrid automatic repeat request (HARQ). The PDCCH may carry information on resource allocation for UEs and control information for downlink channels. The eNB may send a Physical Downlink Shared Channel (PDSCH) in the remaining symbol periods of each subframe. The PDSCH may carry data for UEs scheduled for data transmission on the downlink.

The eNB may send the PSS, SSS, and PBCH in the center 1.08 MHz of the system bandwidth used by the eNB. The eNB may send the PCFICH and PHICH across the entire system bandwidth in each symbol period in which these channels are sent. The eNB may send the PDCCH to groups of UEs in certain portions of the system bandwidth. The eNB may send the PDSCH to specific UEs in specific portions of the system bandwidth. The eNB may send the PSS, SSS, PBCH, PCFICH, and PHICH in a broadcast manner to all UEs, may send the PDCCH in a unicast manner to specific UEs, and may also send the PDSCH in a unicast manner to specific UEs.

A number of resource elements may be available in each symbol period. Each resource element (RE) may cover one subcarrier in one symbol period and may be used to send one modulation symbol, which may be a real or complex value. Resource elements not used for a reference signal in each symbol period may be arranged into resource element groups (REGs). Each REG may include four resource elements in one symbol period. The PCFICH may occupy four REGs, which may be spaced approximately equally across frequency, in symbol period 0. The PHICH may occupy three REGs, which may be spread across frequency, in one or more configurable symbol periods. For example, the three REGs for the PHICH may all belong in symbol period 0 or may be spread in symbol periods 0, 1, and 2. The PDCCH may occupy 9, 18, 36, or 72 REGs, which may be selected from the available REGs, in the first M symbol periods, for example. Only certain combinations of REGs may be allowed for the PDCCH.

A UE may know the specific REGs used for the PHICH and the PCFICH. The UE may search different combinations of REGs for the PDCCH. The number of combinations to search is typically less than the number of allowed combinations for the PDCCH. An eNB may send the PDCCH to the UE in any of the combinations that the UE will search.

Figure 4:
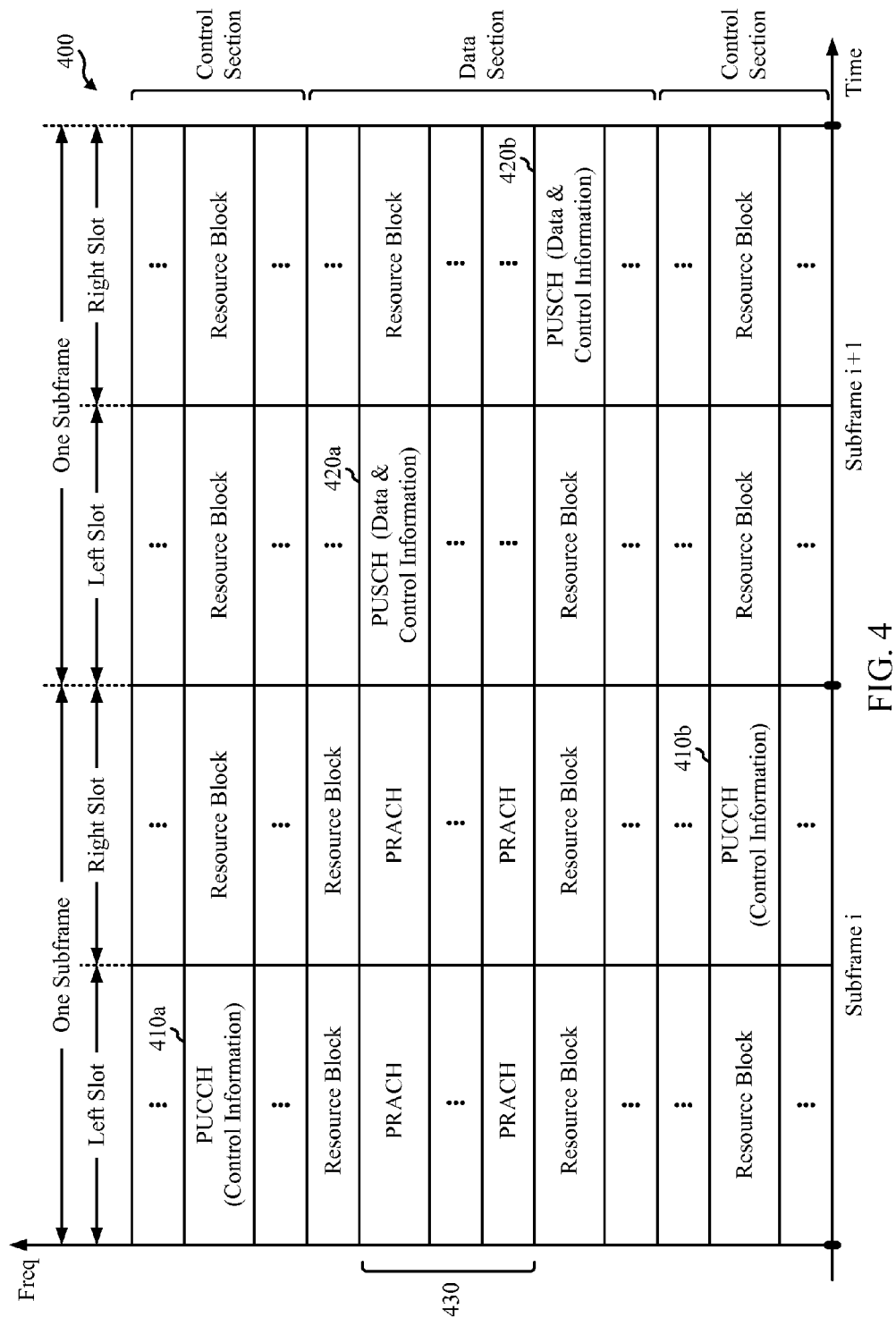
FIG. 4 is a diagram illustrating an example of an UL frame structure in LTE.

FIG. 4 is a diagram 400 illustrating an example of an UL frame structure in LTE. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 410a, 410b in the control section to transmit control information to an eNB. The UE may also be assigned resource blocks 420a, 420b in the data section to transmit data to the eNB. The UE may transmit control information in a physical UL control channel (PUCCH) on the assigned resource blocks in the control section. The UE may transmit only data or both data and control information in a physical UL shared channel (PUSCH) on the assigned resource blocks in the data section. A UL transmission may span both slots of a subframe and may hop across frequency.

A set of resource blocks may be used to perform initial system access and achieve UL synchronization in a physical random access channel (PRACH) 430. The PRACH 430 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make only a single PRACH attempt per frame (10 ms).

Figure 5:
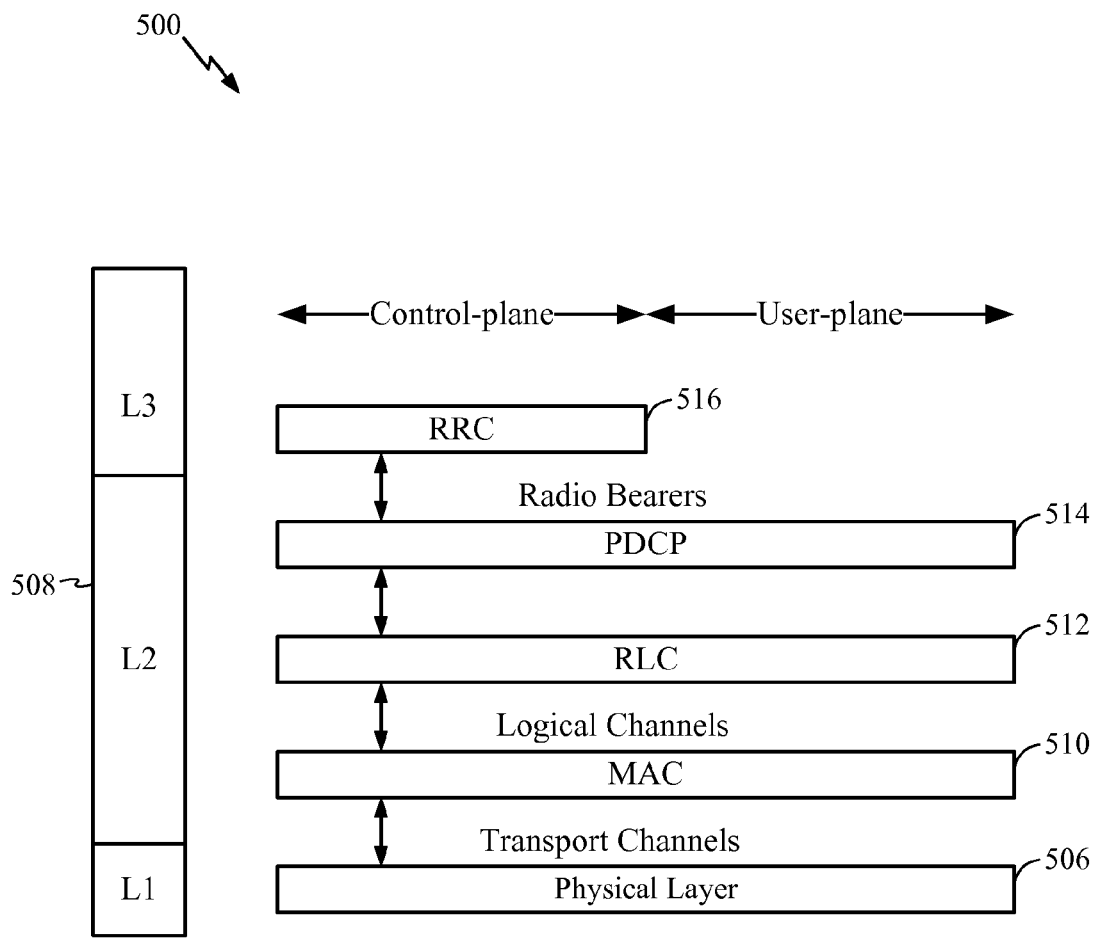
FIG. 5 is a diagram illustrating an example of a radio protocol architecture for the user and control plane.

FIG. 5 is a diagram 500 illustrating an example of a radio protocol architecture for the user and control planes in LTE. The radio protocol architecture for the UE and the eNB is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and eNB over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the eNB on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNBs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and eNB is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (i.e., radio bearers) and for configuring the lower layers using RRC signaling between the eNB and the UE.

Figure 6:
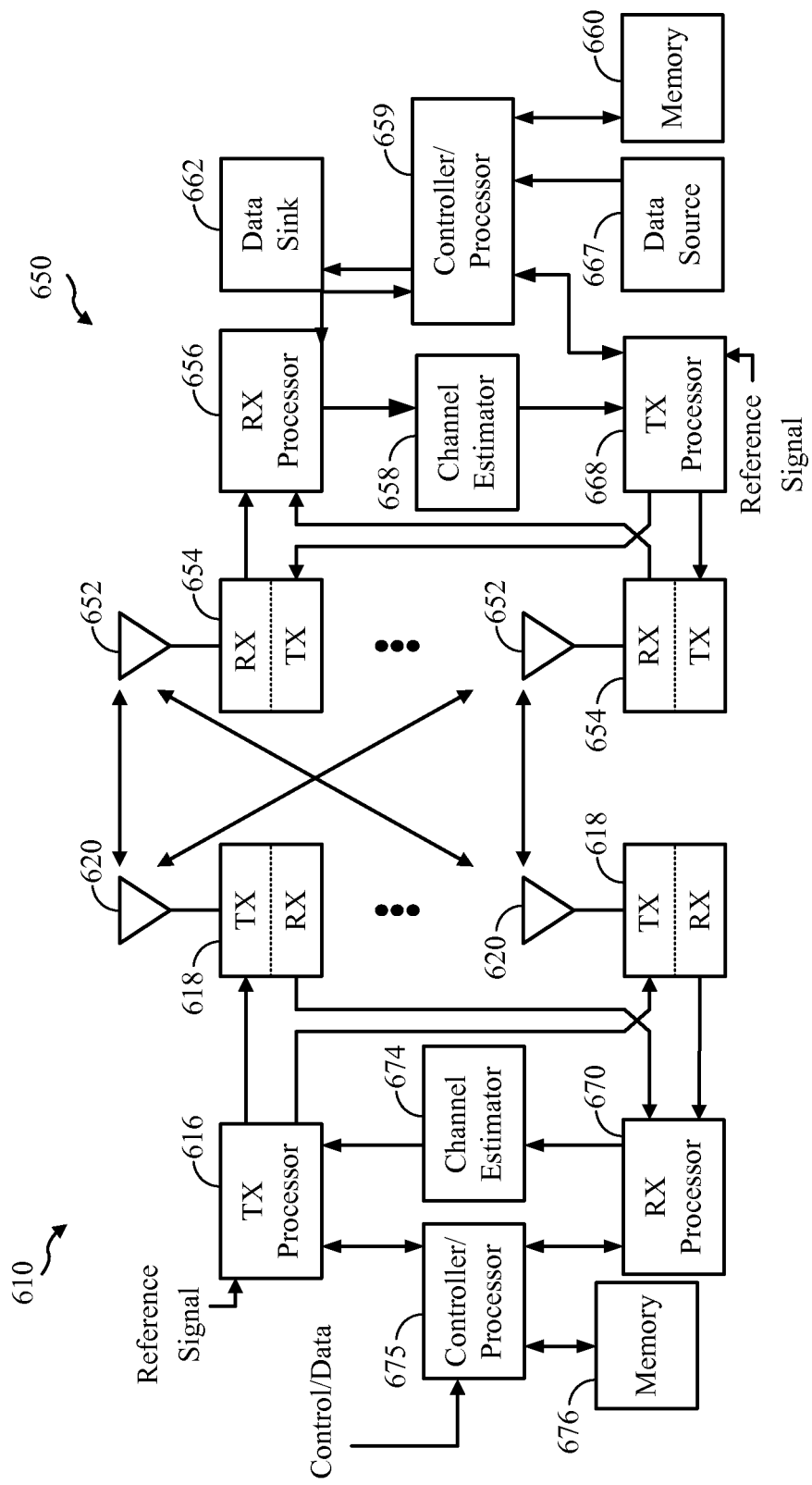
FIG. 6 is a diagram illustrating an example of an evolved Node B and user equipment in an access network, in accordance with certain aspects of the present disclosure.

FIG. 6 is a block diagram of an eNB 610 in communication with a UE 650 in an access network. In the DL, upper layer packets from the core network are provided to a controller/processor 675. The controller/processor 675 implements the functionality of the L2 layer. In the DL, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650.

The transmit (TX) processor 616 implements various signal processing functions for the L1 layer (i.e., physical layer). The signal processing functions include coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream is then provided to a different antenna 620 via a separate transmitter 618TX. Each transmitter 618TX modulates an RF carrier with a respective spatial stream for transmission.

At the UE 650, each receiver 654RX receives a signal through its respective antenna 652. Each receiver 654RX recovers information modulated onto an RF carrier and provides the information to the receiver (RX) processor 656. The RX processor 656 implements various signal processing functions of the L1 layer. The RX processor 656 performs spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the eNB 610. These soft decisions may be based on channel estimates computed by the channel estimator 658. The soft decisions are then decoded and deinterleaved to recover the data and control signals that were originally transmitted by the eNB 610 on the physical channel. The data and control signals are then provided to the controller/processor 659.

The controller/processor 659 implements the L2 layer. The controller/processor can be associated with a memory 660 that stores program codes and data. The memory 660 may be referred to as a computer-readable medium. In the UL, the control/processor 659 provides demultiplexing between transport and logical channels, packet reassembly, deciphering, header decompression, and control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations.

In the UL, a data source 667 is used to provide upper layer packets to the controller/processor 659. The data source 667 represents all protocol layers above the L2 layer. Similar to the functionality described in connection with the DL transmission by the eNB 610, the controller/processor 659 implements the L2 layer for the user plane and the control plane by providing header compression, ciphering, packet segmentation and reordering, and multiplexing between logical and transport channels based on radio resource allocations by the eNB 610. The controller/processor 659 is also responsible for HARQ operations, retransmission of lost packets, and signaling to the eNB 610.

Channel estimates derived by a channel estimator 658 from a reference signal or feedback transmitted by the eNB 610 may be used by the TX processor 668 to select the appropriate coding and modulation schemes, and to facilitate spatial processing. The spatial streams generated by the TX processor 668 are provided to different antenna 652 via separate transmitters 654TX. Each transmitter 654TX modulates an RF carrier with a respective spatial stream for transmission.

The UL transmission is processed at the eNB 610 in a manner similar to that described in connection with the receiver function at the UE 650. Each receiver 618RX receives a signal through its respective antenna 620. Each receiver 618RX recovers information modulated onto an RF carrier and provides the information to a RX processor 670. The RX processor 670 may implement the L1 layer.

The controller/processor 675 implements the L2 layer. The controller/processor 675 can be associated with a memory 676 that stores program codes and data. The memory 676 may be referred to as a computer-readable medium. In the UL, the control/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to support HARQ operations.

The controllers/processors 675, 659 may direct the operation at the eNB 610 and the UE 650, respectively. The controller/processor 659 and/or other processors and modules at the UE 650 may perform or direct operations, for example operations 800 in FIG. 8, and/or other processes for the techniques described herein, for example. The controller/processor 675 and/or other processors and modules at the eNB 610 may perform or direct operations, for example operations 700 in FIG. 7, and/or other processes for the techniques described herein, for example. In aspects, one or more of any of the components shown in FIG. 6 may be employed to perform example operations 700, 800 and/or other processes for the techniques described herein. The memories 676 and 660 may store data and program codes for base station 610 and UE 650, respectively.

Adaptive Antenna Management in LTE

According to certain aspects of the present disclosure, different wireless protocols, e.g., LTE and WiFi, may share a subset of the same physical antennas in a device. The antennas are not used for multiple protocols simultaneously, but instead the device switches the antennas between the protocols over time. Switching of physical antennas may occur on a relatively fast time scale, e.g., 10-100 ms. This is faster than a typical RRC reconfiguration period in LTE. A device may switch the antennas on a per-subframe scale, but normally it switches the antennas approximately once per 10-100 ms (i.e., 10-100 subframes in LTE). The distributed Medium Access Control of some protocols, e.g., WiFi, motivates such a relatively quick switching time. The switching of physical antennas between protocols is referred to as Adaptive Antenna Management.

Different protocols may be active on a device at the same time. This is possible by the device using some antennas for one protocol while using other antennas for another protocol. For example, a UE with 4 physical antennas may switch between the following configurations:

| Configuration | Antennas used for LTE | Antennas used for WiFi |
|---|---|---|
| 1. | 4 | 0 |
| 2. | 2 | 2 |

Adaptive Antenna Management impacts both downlink and uplink communications. Channel state information (CSI) feedback from a UE performing Adaptive Antenna Management is desirable to give the network an indication of the system tradeoffs involved in switching between different configurations or modes.

CSI feedback in LTE is described in 3GPP TS 36.213, entitled "Evolved Universal Terrestrial Radio Access (E-UTRA); Physical layer procedures", which is publicly available. CSI feedback in LTE comprises the following information:

| | |
|---|---|
| Rank Indicator (RI) | This is the preferred precoding rank indicated by the UE. |
| Precoding Matrix Indicator (PMI) | This is the preferred PMI index corresponding to the above RI value in the codebook. For some antenna configurations, the PMI may be composed of a first PMI and a second PMI respectively (e.g., when a dual codebook structure is used). |
| Channel Quality Indicator (CQI) | This informs the network of the channel quality per codeword, conditioned on the above RI and PMI information, such as to support MCS selection at the network side. The CQI value must satisfy the following constraint according to TS36.213: "A single PDSCH transport block with a combination of modulation scheme and transport block size corresponding to the CQI index, and occupying a group of downlink physical resource blocks termed the CSI reference resource, could be received with a transport block error probability not exceeding 0.1." |

Note:
If RI/PMI feedback is not configured (e.g., in TDD), only CQI is reported.

LTE supports two types of CSI feedback: periodic and aperiodic. Aperiodic feedback is performed on a per-request basis, and is triggered by the network through a grant on PDCCH. Reporting of aperiodic feedback uses PUSCH, while periodic feedback may be reported using PUCCH. Therefore, reporting of aperiodic feedback may support higher payload transmissions, because a PUSCH may carry a larger payload than a PUCCH. Various reporting modes are defined that target different performance/overhead tradeoffs.

Periodic feedback is performed at regularly scheduled intervals. Various reporting modes are defined in the specification (e.g., PUCCH 1-1, PUCCH 2-1, etc.). Periodic feedback follows a specific timeline that is configured semi-statically (e.g., periodic feedback may be configured by RRC signaling). Periodic feedback reporting has a limited payload compared to aperiodic feedback reporting because periodic feedback reporting's payload is intended to be carried on PUCCH.

Depending on the specific reporting mode, PMI and/or CQI may be reported on a wideband or subband basis. If reported on a subband basis, the CQI reported by the UE should reflect the channel conditions on the corresponding subband only.

Both the network and the UE must know when switching (i.e., switching of antennas under Adaptive Antenna Management) may occur, in order to align channel feedback and demodulation assumptions. For downlink transmissions, the network and UE must both be aware of the number of physical antennas being used in order to align CSI reporting assumptions and allow correct PDSCH demodulation. For uplink transmissions, the network and UE must both be aware of the number of physical antennas being used in order to align SRS transmission with PUSCH scheduling.

According to certain aspects of the present disclosure, in order to maintain UL operations while performing Adaptive Antenna Management, a device may take steps to manage antenna port virtualization and power control when the physical antennas used for a wireless protocol vary over time. For example, a device may remap antenna ports from antennas which are no longer used for LTE to antennas which are still used for LTE when switching antennas under Adaptive Antenna Management.

According to certain aspects of the present disclosure, a device may manage concurrent sounding reference signal (SRS) transmission under separate antenna hypotheses when the antenna configuration can be varied. For example, a device may track channel conditions based on different sets of SRS transmitted using each antenna configuration.

According to certain aspects of the present disclosure, a device and network may support both CSI reporting under multiple antenna assumptions and CSI reporting using only the 'current' antenna hypothesis. For example, a network may maintain separate CSI information for each antenna configuration used by a device, and a device may report CSI under multiple antenna assumptions when transmitting an aperiodic CSI report while the device's periodic CSI reports include only CSI for the antenna hypothesis in use when the periodic report is transmitted.

According to certain aspects of the present disclosure, the device and network must determine the appropriate RI-bit-width, because the number of physical antennas used by a protocol directly impacts the ranks available to communications by that protocol. For example, a device equipped with four antennas can support up to rank four communications, and needs two bits to report the up to four different ranks (i.e. ranks one, two, three, and four) the device may support, while a device equipped with two antennas can support up to rank two communications, and needs only one bit to report the two different ranks the device can support.

According to certain aspects of the present disclosure, switch points' periodicity and/or offsets (i.e., timing offsets) between the switch points and actual switching of antenna assumptions are defined explicitly. For example, switch points' periodicity and offsets may be explicitly defined by a communications standard, or configured for all served UEs by RRC signaling from a serving cell.

According to certain aspects of the present disclosure, a UE may signal the network an indication of the selected antenna hypothesis the UE is or will be using. For example, a UE may signal its selected antenna hypothesis in one or more bits in a PUCCH.

According to certain aspects of the present disclosure, the network may determine and signal the UE which antenna hypothesis to use. For example, the network (e.g., a serving cell) may transmit a control signaling (e.g., via PDCCH) to a UE instructing the UE to use two antennas.

According to certain aspects of the present disclosure, the antenna hypothesis for DL operations is switched to follow the determinations of switching antenna hypotheses for UL operations, or vice versa. For example, a UE may signal in a PUCCH that the device is switching to two antennas for UL operations, and the UE's serving cell may then transmit to the UE (i.e., DL operation) based on a two antenna hypothesis.

According to certain aspects of the present disclosure, if DL and UL antennas of a device are separate, different antenna hypotheses may be supported for DL and UL operation, respectively. For example, a device may have two antennas for UL operations and four antennas for DL operations, and the device and network may perform UL operations using a two antenna hypothesis and DL operations using a four antenna hypothesis.

According to certain aspects of the present disclosure, a device supplies CSI feedback regarding multiple antenna hypotheses. For example, a device may send an aperiodic CSI report including PMI and CQI selected based on a two antenna hypothesis and another PMI and CQI selected based on a four antenna hypothesis, and the network may receive and use both sets of PMI and CQI. This may be useful if the network should influence or determine which antenna hypothesis to use, especially when a system-tradeoff is needed, e.g., if antennas may be used that could otherwise be utilized for carrier aggregation (CA), the network can determine which antenna hypothesis maximizes network throughput, etc.

According to certain aspects of the present disclosure, the antenna hypothesis for downlink transmissions at a UE may be inferred by the network based on a recent CSI report from the UE. For example, if a UE with four antennas sends a periodic CSI report based on a two antenna hypothesis, then the UE's serving cell (i.e., the network) infers that a two antenna hypothesis should be used for DL transmissions to the UE. Having the network infer the antenna hypothesis may link CSI feedback with the UE demodulation assumption.

According to certain aspects of the present disclosure, the antenna hypothesis for UE demodulation is aligned with the most recent CSI report. For example, a serving cell may switch the antenna hypothesis for UE demodulation to match the antenna hypothesis inferred from the most recent CSI report, whether that report is periodic or aperiodic.

According to certain aspects of the present disclosure, the network may infer the antenna hypothesis used for DL transmissions at a UE from only periodic CSI feedback. For example, a serving cell may switch the antenna hypothesis for UE demodulation to match the antenna hypothesis inferred from the most recent periodic CSI report, while not switching the antenna hypothesis for UE demodulation when receiving an aperiodic CSI report.

According to certain aspects of the present disclosure, the network may infer the antenna hypothesis used for DL transmissions at a UE from only aperiodic CSI feedback. For example, a serving cell may switch the antenna hypothesis for UE demodulation to match the antenna hypothesis inferred from the most recent aperiodic CSI report, while not switching the antenna hypothesis for UE demodulation in response to periodic CSI reports.

According to certain aspects of the present disclosure, the network may infer the antenna hypothesis used for DL transmissions at a UE from both periodic and aperiodic CSI feedback. For example, a serving cell may switch the antenna hypothesis for UE demodulation based on the most commonly occurring antenna hypothesis inferred from a set of recent CSI reports.

According to certain aspects of the present disclosure, a UE may only change the antenna hypothesis for DL demodulation in a subframe where a CSI report takes place, i.e., antenna hypothesis changes may be coincident with CSI reports. For example, a UE may determine that the UE should switch some antennas from supporting LTE to supporting WiFi, and then wait until a subframe in which the UE reports CSI before switching the antennas.

According to certain aspects of the present disclosure, a UE may only change the antenna hypothesis for DL demodulation at a time related to when (e.g., a predefined number of subframes after) a subframe in which a CSI report takes place, i.e., the timing of antenna hypothesis changes may be related to CSI report timing. The predefined number of subframes may be an offset to account for processing delays. For example, a UE may report CSI and immediately change antennas for UL operations (i.e., begin using fewer antennas for LTE UL and more antennas for WiFi UL), while waiting three subframes before switching antennas for DL operations.

According to certain aspects of the present disclosure in which changes in the antenna hypothesis for DL demodulation are linked to periodic CSI reporting, the antenna hypothesis may only change in a subframe when a particular portion (e.g. RI, PMI, or CQI) of CSI is reported. For example, DL antenna hypothesis may only change in a subframe where RI is reported.

According to certain aspects of the present disclosure, switch points for uplink transmissions only occur when a UE transmits SRS, i.e., UL antenna hypothesis changes may be coincident with SRS transmissions; otherwise, no change in uplink transmission antenna configuration is allowed. For example, a UE may determine that a number of antennas for UL operations should be changed, but wait until a subframe in which the UE transmits SRS before making the switch. According to certain aspects of the present disclosure, a linkage between SRS transmission and PUSCH demodulation is defined and maintained. For example, switch points (i.e., times when a decision to switch may be made) may occur in each subframe in which a UE transmits SRS, and the UE and network may change the UL antenna hypothesis (and PUSCH demodulation) based on the SRS transmission a set number of subframes later.

Figure 7:
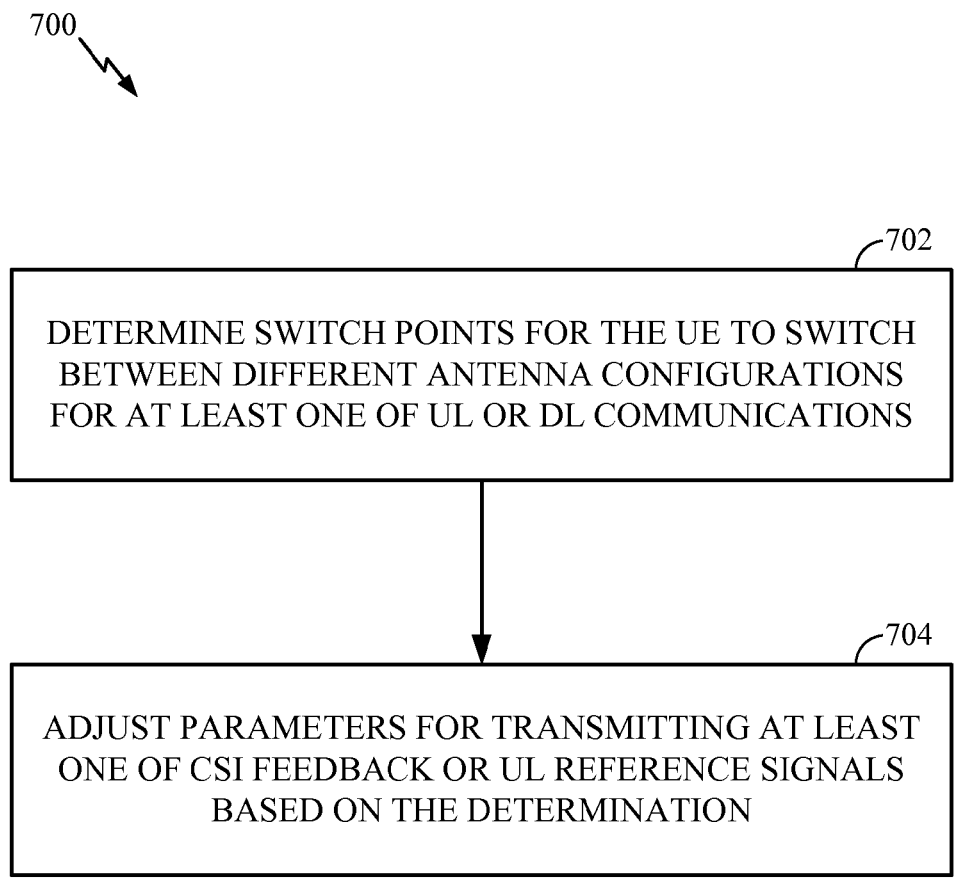
FIG. 7 shows a flow diagram illustrating operations 700 performed by a UE when switching between antenna configurations, in accordance with certain aspects of the present disclosure.

FIG. 7 illustrates example operations 700 that may be performed by a UE when switching between antenna configurations, in accordance with certain aspects of the present disclosure.

Operations 700 may begin, at 702 by determining switch points for the UE to switch between different antenna configurations for at least one of UL or DL communications. At 704, the UE adjusts parameters (e.g., number of physical antennas to use) for transmitting at least one of CSI feedback or UL reference signals, based on the determination.

Figure 8:
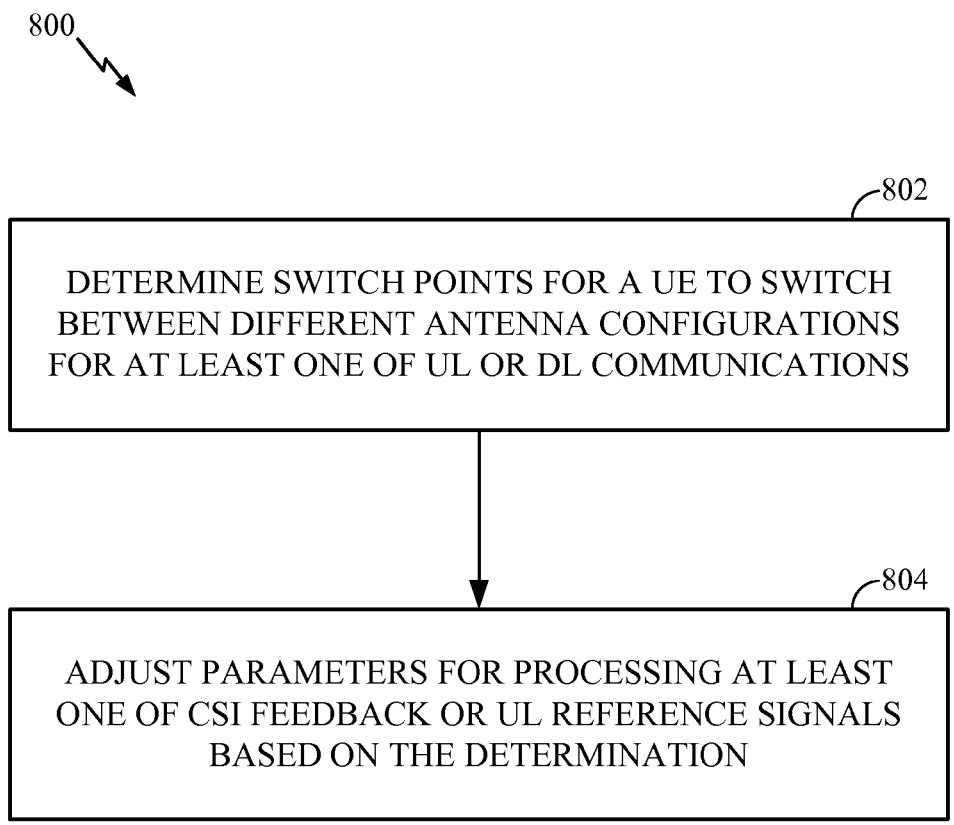
FIG. 8 shows a flow diagram illustrating operations 800 performed by a BS when communicating with a UE which has switched its antenna configuration, in accordance with certain aspects of the present disclosure.

FIG. 8 illustrates example operations 800 performed by a BS when communicating with a UE which has switched its antenna configuration, in accordance with certain aspects of the present disclosure. The operations 800 may be considered as BS-side operations that are complementary to UE-side operations 700.

Operations 800 may begin, at 802 by determining switch points for a UE to switch between different antenna configurations for at least one of UL or DL communications. At 804, the BS adjusts parameters (e.g., antenna assumption for transmitting UE) for processing at least one of CSI feedback or UL reference signals based on the determination.

Figure 9:
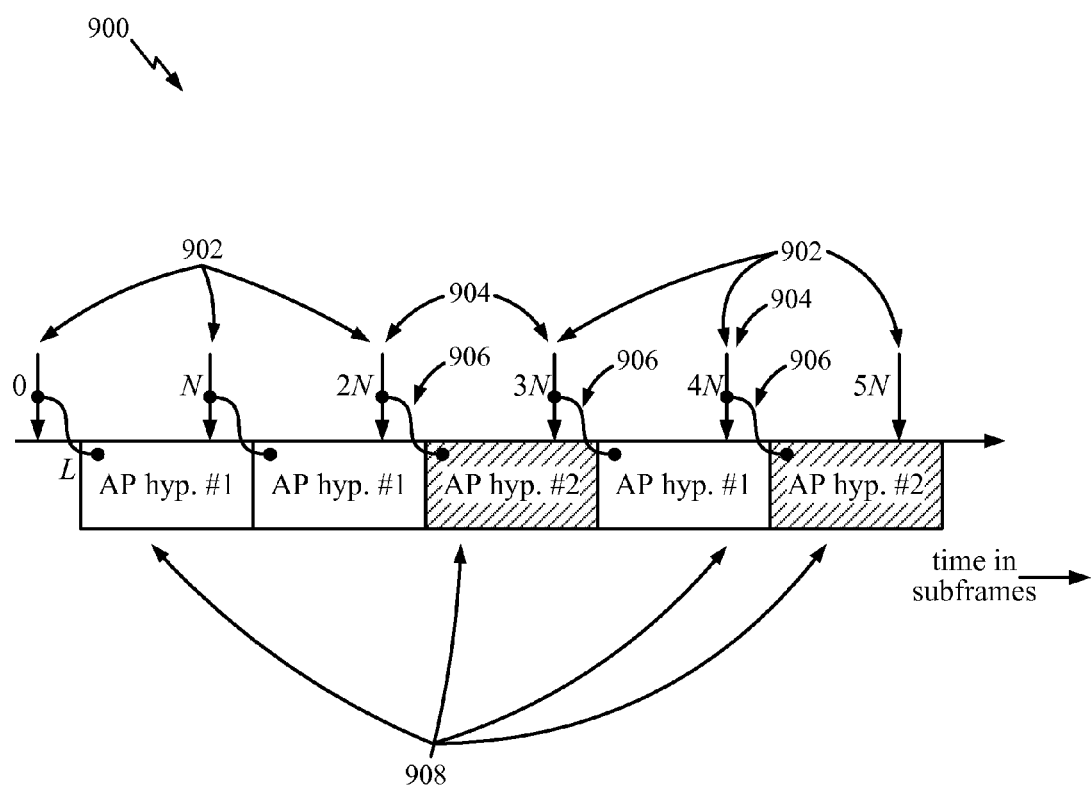
FIG. 9 illustrates a timeline showing SRS transmissions, switch points, offsets between switch points and antenna hypotheses switching, and periods of usage of particular antenna hypotheses, in accordance with certain aspects of the present disclosure.

FIG. 9 illustrates a timeline 900 showing SRS transmissions 902, switch points 904, offsets 906 between switch points and antenna hypotheses switching, and periods 908 of usage of particular antenna hypotheses. According to certain aspects of the present disclosure, SRS is transmitted with period N subframes, as shown. Each SRS transmission defines a switch point. After each SRS is transmitted, an additional offset of L subframes is used to allow for processing delays. After the expiration of the offset of L subframes, the device may switch antenna hypotheses. As illustrated in FIG. 9, the device may (but is not required to) switch antenna hypotheses once for each SRS that is transmitted.

According to certain aspects of the present disclosure, a linkage may be defined between PUSCH demodulation and both periodic and aperiodic SRS. For example, switch points may occur with each SRS transmission, whether periodic or aperiodic, and PUSCH demodulation may change based on the antenna hypothesis associated with each SRS transmission. With a linkage defined between SRS transmission and PUSCH demodulation, PUSCH scheduling and precoder selection at the network may be in line with the antenna hypothesis of the latest SRS transmission, subject to the additional offset of L subframes. Linkage of PUSCH with the latest SRS may avoid explicit signaling of antenna hypotheses. This linkage is a network transparent way of ensuring that PUSCH/SRS are aligned.

According to certain aspects of the present disclosure, a link may be defined between PUSCH demodulation and only periodic SRS. For example, a UE may transmit PUSCH using a number of antennas used in transmitting a most recent periodic SRS, and the network may decode the PUSCH based on an antenna assumption that is a same number of antennas as used by the UE in transmitting a most recent periodic SRS.

According to certain aspects of the present disclosure, a link may be defined between PUSCH demodulation and only aperiodic SRS. For example, a UE may transmit PUSCH using a number of antennas used in transmitting a most recent aperiodic SRS, and the network may decode the PUSCH based on an antenna assumption that is a same number of antennas as used by the UE in transmitting a most recent aperiodic SRS.

According to certain aspects of the present disclosure, the UE indicates which of the one or more antenna hypotheses should be assumed as active for PUSCH scheduling. For example, a UE may indicate in a PUCCH that an antenna hypothesis associated with periodic SRS should be assumed, and not a hypothesis associated with an aperiodic SRS.

According to certain aspects of the present disclosure, the network signals which of the one or more antenna hypotheses should be assumed as active for PUSCH scheduling. For example, the network may indicate in a PDCCH transmitted to a UE that an antenna hypothesis associated with periodic SRS should be assumed, and not a hypothesis associated with an aperiodic SRS.

According to certain aspects of the present disclosure, antenna port (AP) configuration of a device may be based on the largest supported antenna hypothesis, e.g., if 4 TX antennas and 2 TX antennas are supported by a device, the device configures 4 uplink antenna ports.

According to certain aspects of the present disclosure, a device will have predefined antenna port virtualizations (i.e., configurations) to use when fewer than the maximum number of physical antennas is used. The device may select one of a plurality of predefined virtualizations for transmitting a signal to a base station. For example, antenna port virtualizations may be defined in a specification and stored in non-volatile memory of a device.

According to certain aspects of the present disclosure, a device may use the below exemplary antenna port virtualization. When a maximum of 4 TX antennas are supported, the 2 TX antenna hypothesis would be virtualized as follows:

| Antenna port | Associated physical antenna |
| --- | --- |
| AP-40 | First physical antenna |
| AP-41 | Second physical antenna |
| AP-42 | First physical antenna |
| AP-43 | Second physical antenna |

According to certain aspects of the present disclosure, a device may refrain from using two antenna ports (i.e., no transmission uses those antenna ports). The device may use the following exemplary virtualization:

| Antenna port | Associated physical antenna |
| --- | --- |
| AP-40 | First physical antenna |
| AP-41 | Second physical antenna |
| AP-42 | No association and no transmissions |
| AP-43 | No association and no transmissions |

According to certain aspects of the present disclosure, antenna virtualization can be performed similarly for different numbers of antenna ports. For example, for the case of a device with a maximum of 2 TX antennas switching down to 1 TX antenna:

| Antenna port | Associated physical antenna |
| --- | --- |
| AP-40 | First physical antenna; |
| AP-41 | First physical antenna, or the device may refrain from using AP-41 (no transmissions and no association) |

Predefined antenna virtualization may be beneficial because in certain aspects it allows the network to detect, e.g., based on SRS, which antenna hypothesis is used. For example, when the network receives SRS and determines that APs 40 and 41 are highly correlated with APs 42 and 43, respectively, the network may deduce that a 2 TX antenna hypothesis was used. According to certain aspects of the present disclosure, the network may also deduce the maximum rank that can be used for communications with that device. For example, when the network receives SRS from a UE and determines that APs 40 and 41 are highly correlated with APs 42 and 43, respectively, the network may deduce that the UE can support a maximum of rank two communications.

In contrast, if the aforementioned AP combinations are not highly correlated, the network may deduce that the 4 TX antennas case applies.

According to certain aspects of the present disclosure, antenna virtualization is maintained unchanged between SRS and PUSCH transmissions associated with the same antenna hypothesis. For example, a device may transmit SRS using two antennas with antenna ports 40 and 42 mapped to the first physical antenna and antenna ports 41 and 43 mapped to the second physical antenna, and use the same mapping (and the network decodes the signal using the same hypothesis) for PUSCH transmitted using two antennas.

According to certain aspects of the present disclosure, the power level may be reduced for antenna ports that are mapped to the same physical antenna. For example, the power level for APs 40/42 and 41/43 may be reduced if two APs are mapped to the same physical antenna.

According to certain aspects of the present disclosure, uplink MIMO transmission rank is adapted implicitly by supporting a linkage between SRS and PUSCH. If less than the maximum number of APs is used, the network would detect a rank deficiency as a result of high correlation among a subset of antennas. For example, if the network detects high correlation between antenna ports and deduces that a UE transmitted using a reduced number of antennas, the network may reduce the MIMO rank used in decoding a transmission from the UE.

According to certain aspects of the present disclosure, the network will not schedule a transmission rank that exceeds the number of physical antennas associated with the corresponding antenna hypothesis in use by a device. For example, if the network has deduced that a UE is using two physical antennas, the network will schedule only rank two or rank one transmissions to and from the UE.

According to certain aspects of the present disclosure, if the network nevertheless signals a transmission rank that exceeds the number of physical antennas associated with the corresponding antenna hypothesis in use by a device, the UE may nevertheless obey the eNB (i.e., the network) signaling and remain consistent with the antenna virtualization scheme. For example, if a UE is using only two physical antennas and is scheduled for a rank four UL transmission by the network, the UE may transmit using a rank two UL transmission using the assigned time-frequency resources and the antenna port virtualization scheme defined for four antenna ports and two physical antennas.

According to certain aspects of the present disclosure, multiple SRS configurations may be defined to allow concurrent CSI estimation at the eNB under multiple antenna hypotheses. This may be beneficial if the network helps to determine the antenna switching and UL performance determines this selection at least in part. For example, a two antenna SRS configuration and a four SRS antenna configuration may be defined, and a UE may transmit SRS using both configuration, enabling an eNB to determine CSI for both hypotheses.

According to certain aspects of the present disclosure in which changes in the antenna hypothesis for DL demodulation are linked to only aperiodic CSI reporting, periodic CSI reporting may be performed under a conservative antenna hypothesis (e.g., the hypothesis that requires a minimum number of RX antennas). Performing periodic reporting under a conservative antenna hypothesis ensures that CSI is always available for scheduling the UE. For example, a UE may have four antennas, with two always used for LTE and two allowed to switch between LTE and WiFi. In this example, the UE would always perform periodic CSI reporting with a two antenna hypothesis, so if the network schedules a DL transmission to the UE, the network will schedule it based on the two antenna hypothesis, and the UE will always have the two antennas available (because the UE always uses two antennas to receive LTE transmissions) to receive the DL transmission.

According to certain aspects of the present disclosure, an aperiodic CSI report may reflect the currently active antenna hypothesis at the UE (e.g., 2 RX antennas vs. 4 RX antennas switching). In these aspects, the network is implicitly informed of the current antenna hypotheses when the network receives an aperiodic CSI report.

According to certain aspects of the present disclosure, the network may assume that an antenna hypothesis remains valid until a more recent aperiodic CSI report indicates otherwise.

According to certain aspects of the present disclosure, the network may assume that an antenna hypothesis remains valid until a certain number of subframes passes (e.g., predefined expiration in case the network does not trigger another aperiodic CSI report for a long time). For example, a UE may transmit an aperiodic CSI report based on a four antenna hypothesis, and the network may transmit to the UE based on the four antenna hypothesis for up to ten subframes, but transmissions from the network to the UE after ten subframes are transmitted based on a two antenna hypothesis.

According to certain aspects of the present disclosure, CSI feedback under multiple antenna hypotheses may be supported. For example, a UE may send an aperiodic CSI report including PMI and CQI selected based on a two antenna hypothesis and another PMI and CQI selected based on a four antenna hypothesis. This may be beneficial if the network influences or determines selection of the antenna hypotheses.

According to certain aspects of the present disclosure, an indicator may be added to the existing CSI feedback payload that indicates which of one or more antenna hypotheses was assumed in deriving the CSI. For example, a bit may be included in a CSI feedback payload, wherein the bit is set to zero or one if the CSI is based on a minimum or maximum number of antennas, respectively. Including an indicator to inform the network of the antenna hypothesis used in deriving the CSI may enable the network to perform averaging separately for each antenna hypothesis.

According to certain aspects of the present disclosure, feedback of multiple antenna hypotheses may be combined into the same CSI report. This may be feasible only for the currently active antenna hypothesis and other hypotheses that utilize a smaller number of antennas. For example, if a UE currently uses 4RX antennas, the UE may generate both 4-antenna-based and 2-antenna-based reports. Conversely, if the UE currently only supports 2 RX antennas, it may only provide a 2-antenna-based report, e.g., due to lack of availability of the other antennas.

According to certain aspects of the present disclosure, in devices that do not perform antenna switching, the RI-bitwidth of a CSI report is determined based on the maximum supportable rank, which depends both on the eNB antenna configuration and the number of UE receive antennas.

According to certain aspects of the present disclosure, the RI-bitwidth of a CSI report for devices that perform antenna switching is defined based on the maximum supportable number of layers across supported antenna hypotheses. For example, if a device has four antennas but is only using two antennas for LTE, the RI-bitwidth is based on two layers (i.e., only one bit is required) because the two antennas can only support two layers.

According to certain aspects of the present disclosure, RI-bitwidth is determined separately for periodic and aperiodic feedback. For example, if a UE with four antennas makes an aperiodic CSI report based on a four antenna hypothesis, the RI-bitwidth may be two bits, based on the four layers supported by the four antenna hypothesis. The same UE making a periodic CSI report based on a two antenna hypothesis would use a RI-bitwidth of one pit in the periodic CSI report.

According to certain aspects of the present disclosure, a minimum number of available antennas may be used for CSI feedback and UE capability indication. For example, a UE with four antennas that will always use at least two antennas for LTE may base all of the UE's CSI reports on a two antenna hypothesis. Using a minimum number of available antennas for CSI feedback and UE capability indication may make it completely transparent to the network that multiple antennas are available at the UE. For demodulation, the additional antennas may be used to achieve superior decoding performance. As link adaptation by the network is based on CSI feedback, in these aspects there is no link adaptation gain or support for higher ranks than ranks associated with the minimum number of UE antennas. This may have the benefit of being completely transparent to the network; the network need not know for PDSCH transmission how many UE antennas are currently available.

According to certain aspects of the present disclosure, a device may use signals from those antenna not used for CSI feedback and UE capability indication, or a subset of antenna signals for cell search, PBCH decoding, blind detection for data interference cancellation (IC), acquiring a neighboring cell's information, such as PBCH, SIB1, etc.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

As used herein, a phrase referring to "at least one of" a list of items refers to any combination of those items, including single members. As an example, "at least one of: a, b, or c" is intended to cover: a, b, c, a-b, a-c, b-c, and a-b-c.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method for wireless communications by a user equipment (UE), comprising:
   determining, by the UE, switch points for the UE to switch between different antenna configurations for at least one of uplink or downlink communications, wherein the determining comprises deriving the switch points based on timing of at least one of transmitting channel state information (CSI) feedback or transmitting uplink reference signals; and adjusting, by the UE, parameters for transmitting at least one of the CSI feedback or the uplink reference signals based on the determination.

2. The method of claim 1, wherein:
switch points for switching between downlink antenna configurations coincide with when the UE transmits CSI feedback.

3. The method of claim 1, wherein:
switch points for switching between downlink antenna configurations coincide with when the UE transmits uplink reference signals.

4. The method of claim 1, wherein determining the switch points comprises:
determining the switch points based on at least one of a defined periodicity or offset.

5. The method of claim 4, further comprising:
selecting an antenna configuration to use after a switch point; and
providing an indication of the selected antenna configuration.

6. The method of claim 4, further comprising:
receiving an indication of an antenna configuration to use after a switch point.

7. The method of claim 1, further comprising:
providing CSI feedback for multiple antenna configurations.

8. The method of claim 7, further comprising:
receiving an indication of an antenna configuration selected based, at least in part, on the CSI feedback provided for the multiple antenna configurations.

9. The method of claim 1, wherein:
the UE is configured with a plurality of uplink antenna configurations based on a number of physical antennas available for uplink transmissions.

10. The method of claim 1, further comprising:
transmitting uplink reference signals on selected uplink antenna configurations.

11. The method of claim 1, wherein:
the UE is configured to utilize a downlink antenna configuration for processing downlink transmissions that corresponds to a most recent transmitted CSI feedback.

12. The method of claim 1, further comprising:
determining a rank indication (RI) bitwidth based on a maximum supportable number of layers across an antenna configuration.

13. The method of claim 1, further comprising:
determining a rank indication (RI) bitwidth separately for periodic and aperiodic feedback.

14. A method for wireless communications by a base station (BS), comprising:
determining, by the BS, switch points for a user equipment (UE) to switch between different antenna configurations for at least one of uplink or downlink communications, wherein the determining comprises deriving the switch points based on timing of at least one of the UE transmitting channel state information (CSI) feedback or the UE transmitting uplink reference signals; and
adjusting, by the BS, parameters used for processing at least one of the CSI feedback or the uplink reference signals based on the determination.

15. The method of claim 14, wherein:
switch points for switching between downlink antenna configurations coincide with when the UE transmits CSI feedback.

16. The method of claim 14, wherein:
switch points for switching between downlink antenna configurations coincide with when the UE transmits uplink reference signals.

17. The method of claim 14, wherein determining the switch points comprises:
determining the switch points based on at least one of a defined periodicity or offset.

18. The method of claim 17, further comprising:
selecting an antenna configuration to use after a switch point; and
signaling to the UE an indication of the selected antenna configuration.

19. The method of claim 17, further comprising:
receiving an indication of an antenna configuration in use after a switch point.

20. The method of claim 14, further comprising:
receiving CSI feedback for multiple antenna configurations.

21. The method of claim 20, further comprising:
transmitting an indication of an antenna configuration selected based, at least in part, on the CSI feedback provided for the multiple antenna configurations.

22. The method of claim 14, wherein:
the UE is configured with a plurality of uplink antenna configurations based on a number of physical antennas available for uplink transmissions.

23. The method of claim 14, further comprising:
receiving uplink reference signals on selected uplink antenna configurations.

24. The method of claim 14, wherein:
the UE is configured to utilize a downlink antenna configuration for processing downlink transmissions that corresponds to a most recent transmitted CSI feedback.

25. The method of claim 14, further comprising:
determining a rank indication (RI) bitwidth based on a maximum supportable number of layers across an antenna configuration.

26. The method of claim 14, further comprising:
determining a rank indication (RI) bitwidth separately for periodic and aperiodic feedback.

27. An apparatus for wireless communications by a user equipment (UE), comprising:
at least one processor configured to determine switch points for the UE to switch between different antenna configurations for at least one of uplink or downlink communications, wherein the determining comprises deriving the switch points based on timing of at least one of transmitting channel state information (CSI) feedback or transmitting uplink reference signals, and adjust parameters for transmitting at least one of the CSI feedback or the uplink reference signals based on the determination; and
a memory coupled with the at least one processor.

28. An apparatus for wireless communications by a base station (BS), comprising:
at least one processor configured to determine switch points for a user equipment (UE) to switch between different antenna configurations for at least one of uplink or downlink communications, wherein the determining comprises deriving the switch points based on timing of at least one of the UE transmitting channel state information (CSI) feedback or the UE transmitting uplink reference signals, and adjust parameters used for processing at least one of the CSI feedback or the uplink reference signals based on the determination; and
a memory coupled with the at least one processor.

* * * * *